Nov. 3, 1964
R. O. WILEY
3,155,807
AUXILIARY ACTUATING MEANS FOR ACTUATING
A CIRCUIT CONTROLLING WIRING DEVICE
Filed Jan. 19, 1960
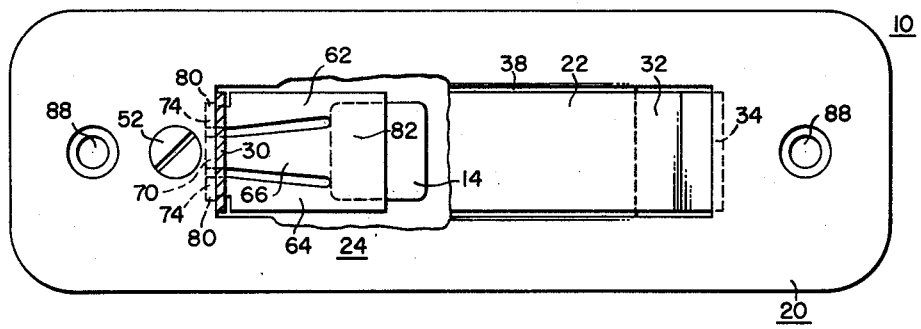
Fig. 1.
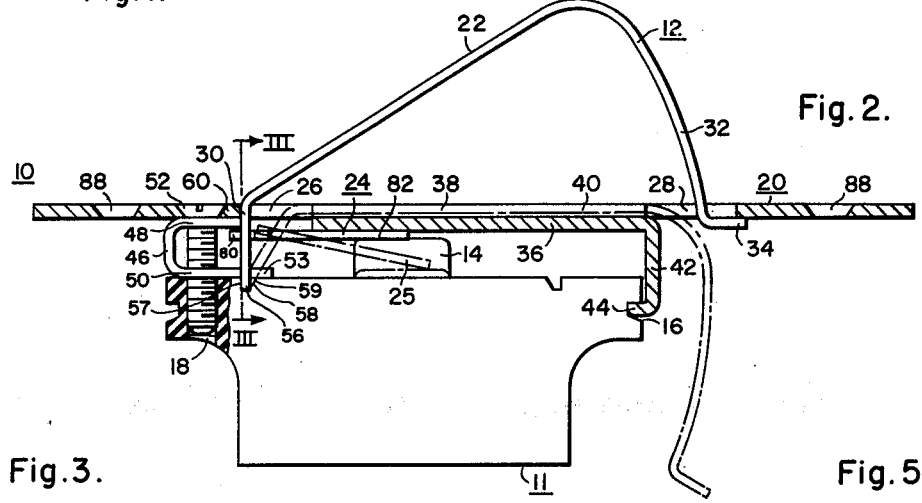
Fig. 3.  Fig. 5.
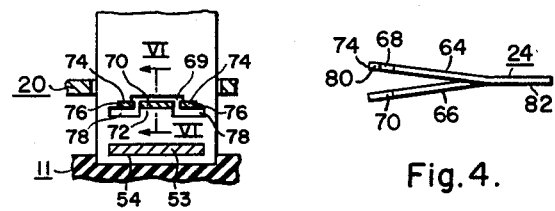
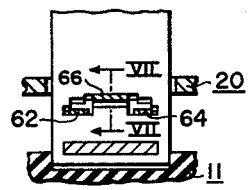
Fig. 4.
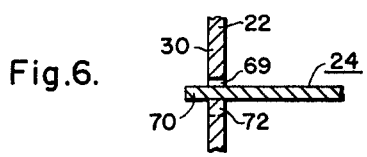
Fig. 6.
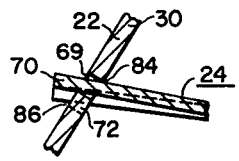
Fig. 7.
WITNESSES
Edwin C. Bassler
Edward F. Possessky
INVENTOR
Roy O. Wiley
BY
Donald Smith
ATTORNEY

United States Patent Office 3,155,807
Patented Nov. 3, 1964

1

3,155,807
AUXILIARY ACTUATING MEANS FOR ACTUATING A CIRCUIT CONTROLLING WIRING DEVICE
Roy O. Wiley, Newtown, Conn., assignor to Westinghouse Electric Corporation, East Pittsburgh, Pa., a corporation of Pennsylvania
Filed Jan. 19, 1960, Ser. No. 3,401
10 Claims. (Cl. 200—172)

The present invention relates to wiring devices and more particularly to an actuating arrangement of physical elements for use in a wiring device so as to enable the continuity of an electrical circuit to be controlled.

In order to provide for using a wiring device that is constructed for controlling the continuity of an electrical circuit, it is necessary that actuating means be included therewith. In comparatively simple form, means for actuating the circut controlling parts of such a wiring device can be provided in the form of an ordinary button or lever, as part of a toggle arrangement for instance, so that the desired actuation is accomplished merely by applying operational forces to the button or the lever. However, in certain applications, it is useful to employ actuating means that provide other operating features in cooperation with the one already noted, namely the mere transmittal of operating forces to the operative parts of the wiring device.

For example, it is desirable, in applications such as the one to be noted hereinafter, that the actuating means include an operating member which responds to the application and to the removal of operating forces to cause cooperating movement of the operative parts of the wiring device only over a discrete segment of the total span of the operating member movement which is incident to the full application or to the full removal of the operating forces. In this manner, cooperative movement of the operative parts of the circuit controlling wiring device is provided during the occurrence of the discrete operating segment of movement of the operating member, and not during the occurrence of any other segment of movement of the operating member. As will be determined subsequently, additional operating features can also be provided along with the one just exemplified.

The preceding general considerations have been set forth only to provide a fuller perspective of the invention, particularly in conjunction with the more specific and ensuing descriptive matter.

Accordingly, it is an object of the invention to provide novel means for actuating a circuit controlling wiring device.

It is another object of the invention to provide actuating means of the character described so that operating forces are transmitted to the circuit controlling parts of the wiring device only over a portion of the total span of movement of an operating member which forms a part of the actuating means.

It is another object of the invention to provide actuating means of the character thus far described such that the actuating means is returned to its original position upon removal of the operating forces.

It is a further object of the invention to provide actuating means of the character already described such that the forces which effect a return of the actuating means

2 to its original position do not interfere with the already noted effect of applied operating forces.

It is an additional object of the invention to provide actuating means for a circuit controlling wiring device with the actuating means being mounted relative to other parts of the wiring device in a novel and economic manner.

It is still another object of the invention to provide actuating means which is secured in a novel manner to a wiring device to provide an economic assembly and a unique mode of operation for the actuating means.

These and other objects of the invention will become more apparent upon consideration of the following detailed description of an illustrative embodiment of the invention as related to the attached drawing, in which:

FIGURE 1 is a top plan view of actuating means being of the character described and having certain portions cut away for clarity, along with a circuit controlling wiring device.

FIGURE 2 is an elevational view of the arrangement shown in FIGURE 1, with certain other portions being cut away for clarity.

FIGURE 3 is a partial view of the arrangement shown in FIGURE 2, taken along the reference line III—III thereof.

FIGURE 4 is an elevational view of a spring member shown assembled with the actuating means and the wiring device in FIGURE 2.

FIGURE 5 is a partial view taken along the reference line III—III of FIGURE 2, with the spring member shown in FIGURE 4 being shown in a second position as distinguished from a first position shown in FIGURE 3.

FIGURE 6 is a partial view taken along the reference line VI—VI of FIGURE 3 in order to illustrate more clearly the first position of the spring member.

FIGURE 7 is a partial view taken along the reference line VII—VII of FIGURE 5 in order to illustrate more clearly the noted second position of the spring member.

With regard to the broad precepts of the invention, actuating means for a circuit controlling wiring device includes an operating member, against which operating forces can be applied, and spring means, which moves in response to the operating forces to actuate the circuit controlling parts of the wiring device only over a portion of the total span of movement of the operating member. With such an arrangement, desirably provided movement other than the operating interval of movement of the operating member can be accomplished without affecting the controlling function of the wiring device. Additionally, means are provided for securing the actuating means to the wiring device so that the assembly of the actuating means, including the operating member, can be made with economy to provide for an efficient operation of the actuating means. To illustrate more clearly but not to limit these broad principles of the invention, the detailed description will now be set forth.

The arrangement of physical elements, being shown in FIGURES 1 and 2 as comprising a wiring device 10, includes a circuit controller 11 and means 12 for actuating and mounting the circuit controller 11. The circuit controller or switch 11 can be any one of conventional form, provided certain structure, to be described, is included therewith to adapt it for cooperation with the actuating and mounting means 12. For example, a push button 14 can be provided for the switch 11 in order to provide for actuating its operative parts in controlling the continuity of an electrical circuit. In addition, a slot 16 desirably is provided in one end of the switch 11 and a threaded opening 18 desirably is provided in the other end of the switch 11 to comprise means for engaging the actuating and mounting means 12.

The actuating means 12, which has been described to this point only in general terms and which will subsequently be described in more specific terms, comprises an arrangement of physical elements which provides for operating the switch 11. A mounting plate 20 is included with the actuating means 12 to provide for its assembly with the switch 11 and to provide for mounting the resultant assembly upon a suitable support, of which an example will be described hereinafter.

The actuating means 12 also includes a unique arrangement for transmitting operating forces to enable operation of the switch 11 through a depression of its actuating means, push button 14, or other suitable operator. The transmitting arrangement comprises an operating lever 22 which can be moved, here pivotally, in response to operating forces and a spring member 24 which is engaged with the lever 22 in a manner such that it moves, here pivotally, with the lever 22 to depress the push button 14 of the switch 11 over only a prescribed interval of the total span of pivotal movement of the lever 22. The latter operating feature will be described more fully hereinafter.

In order to provide for assembly of the mounting plate 20 with the operating lever 22 and the spring member 24, a pair of openings 26 and 28, spaced from each other, are provided adjacently to a central portion 36 of the plate 20. An upstanding portion 30 of the lever 22 is passed through the opening 26 and a forearm portion 32 is passed through the opening 28. It is to be noted that a rim portion 34, which is extended generally transversely of the lever forearm portion 32, is provided for engagement with the underside of the plate 20, as viewed in FIG. 2, so that a limit of counterclockwise pivotal movement of the lever 22 is formed by the plate 20. In addition, the central portion 36 of the plate 20, being located between the openings 26 and 28, is deformed downwardly, as viewed in FIG. 2, to provide a recession 38 in the plate 20 in order that the lever 22 can be located in a flush relationship relative to the plate 20 when the lever 22 has been pivoted to its limiting clockwise position against the plate portion 36, as indicated by the reference character 40 in FIG. 2.

To provide for assembly of the mounting plate 20 with the wiring device 10, the plate portion 36 includes a downwardly extended ear 42, as viewed in FIGURE 2, which has an inwardly extended portion or lobe 44 for engagement with the switch 11 in the slot 16. Support of the plate 20 in a spaced position relative to the adjacent side of the switch 11 to allow for movement of the push button 14 is enabled through the use of a bracket or spacer 46, having, in this instance, a U-shape. Each of a pair of legs 48 and 50 of the spacer 46 is provided with an opening (not shown) for passage of a fastener 52 which can be used to assemble together the plate 20, the spacer 46, and the adjacent end of the switch 11. The fastener 52 is shown here in the form of a screw which, when passed through an opening 54 in the plate 20, and the aforementioned openings in the spacer legs 48 and 50, threadedly engages the switch 11 in the opening 18 to secure in assembled relation the engaged parts.

If desired, other means can be employed to secure the switch 11 and a mounting plate similar to the plate 20 in an assembled and spaced relation. For example, an integral part of the switch 11 could be extended upwardly to replace the mounting ear 42 and the spacer 46 and thereby, in this instance, to provide the desired spacing for the spring member 24. In such a case, either integral or separate securing means could be provided for assembling the mounting plate 20 with the switch 11. However, if withdrawal movement of the operating lever 22 is to be restricted in this example, as it will be ascertained to be in the illustrative embodiment of the invention through the use of the spacer 46, means, either separate from or compounded with the securing means, for providing such a relation would have to be included.

As just related, means for restricting withdrawal movement of the operating lever 22 from the switch 11 is included here through the use of the spacer 46. Thus, the lower leg 50 of the spacer 46 is provided with a greater longitudinal dimension than that of the upper leg 48 so that an end leg portion 53 can be extended through a slot 54 provided in the upstanding portion 30 of the lever 22, as shown in FIG. 3.

Assembly of the spacer 46 so that the upper side of the upper leg 48 is flush against the underside of the mounting plate 20 and so that the underside of the lower leg 50 is flush against the upper side of the switch 11, and securance of these parts through the use of the fastener 52, as previously described, provides for restricting withdrawal movement of the operating lever 22 outwardly from the plane of the upper side of the switch 11. This is so because the outer spacer portion 53 exerts downward restrictive forces on the lever 22 when any outward or withdrawal forces are imposed upon the lever 22.

As a further notation, a pivotal portion 56 of the upstanding lever leg 30 is received in a slot 58 which is provided along the upper side of the switch 11. As viewed in FIGURE 2, one upstanding side of the slot 57 is formed vertically while the opposite side 59 is formed at an acute angle from the upstanding or vertical direction. The upstanding side 57 of the slot 58 contributes to forming a counterclockwise limit of travel for the operating lever 22, and the angled side 59 of the slot 58 allows for clockwise movement of the lever 22 and can contribute to forming the limiting clockwise position of the lever 22.

It is obvious, therefore, that the slot 58 generally provides a pivot point for movement of the operating lever 22. It is also to be noted that, in the limiting counterclockwise position of the lever 22, the lever upstanding portion 30 engages a portion 60 of the mounting plate 20 and, if desired, the end of the spacer leg 48, in order to provide additional limiting forces in forming the limiting counterclockwise position.

In previous comments, it was noted that the spring member 24 is engaged with the operating lever 22 to transmit operating forces, in a unique manner now to be described, to the switch button 14. With reference to FIGURES 1 and 4, the spring 24 has a generally rectangular contour and is provided with a pair of outer legs 62 and 64 and an inner leg 66. A material such as sheet steel, or any other having suitable resiliency characteristics, can be employed in the construction of the spring 24. The inner leg 66 is inclined downwardly at a prescribed angle from the plane of the spring 22, as viewed in FIG. 4, to provide resilient forces for operation of the spring 24. Similarly, the outer legs 62 and 64 are inclined upwardly for the same purpose. A notch 68 is provided in the outer side of the spring legs 62 and 64 for latching engagement with the lever upstanding portion 30.

An irregularly shaped slot 69 is provided in the lever upstanding portion 30 for engagement with the spring member 24. To assemble the spring 24 with the lever 22, the spring arms 62, 64 and 66 are pressed toward each other through the plane of the spring 24 and inserted into the slot 69 in a direction normal to the plane of the lever upstanding portion 30. Upon releasing the spring arms 62, 64 and 66, an end section 70 of the inner spring arm 66 engages a tab 72 of the lever portion 30 in the slot 69 and an end section 74 of each of the outer spring arms 62 and 64 engages, respectively, the lever portion 30 in a notch 76, which is offset from the slot 69.

With the spring outer arms 62 and 64 located in the position just noted, the arm notches 68 are interlatched, respectively, with the lever notches 76. An end extension 78 of the slot 69 is provided adjacently to each of the lever notches 76 in order to provide for pivotal movement of tabs 80 of the outer spring arms 62 and 64 which are adjacent to the outer arm notches 68, respectively.

To assemble the described physical elements of the illustrative embodiment of the invention, the mounting plate lobe 44 can first be inserted in the switch slot 16 so that the mounting plate 20 is positioned relative to the switch 11 as shown in FIGURE 2. The combination of the operating lever 22 and the spring member 24, engaged as described above, can then be assembled with relation to the plate 20, as shown in FIGURE 2, so that the lever pivot portion 56 is inserted in the switch slot 56. The spring 24 then extends inwardly of the switch 11 so that an end portion 82 of the spring 24 overlies the upper side of the switch push button 14.

As a final step in the assembly, the spacer 46 can be inserted between the mounting plate 20 and the switch 11 so that the spacer leg portion 53 projects through the slot 54 of the lever upstanding portion 30 and so that the fastener 52 can be inserted through the plate 20 and the spacer 46 to engage the switch 11 and to provide an assembled relation for the entire arrangement of physical elements. It is already clear that operating forces causing pivotal movement of the operating lever 22 will be transmitted to the spring member 24 for depression of the push button 14. The mode of this operation, described only in general terms to this point, will now be described more specifically.

With reference to FIGURES 3 and 6, the spring member 24 is stably related to the operating lever 22 which is, in this instance, in its limiting counterclockwise position (FIG. 2). The relative positioning of the spring 24 and the lever 22 is dynamically stable in FIGURES 3 and 6 because the inner spring leg 66, being prestressed in a downward direction, exerts downward forces on the lever 22, which are substantially equalized in this position by opposing upward forces on the lever 22 induced by the upwardly prestressed outer spring arms 62 and 64. The fact that these equalized forces are distributed over the entire lever cross sectional area which faces the lever slot 69 means that no net torque is exerted on the lever 22 by the spring 24. Thus, the position of the spring 24 relative to the lever 22 wherein the plane of the spring 24 is substantially normal or perpendicular to the plane of the upstanding lever portion 30, as shown in FIGURE 6, is one which is dynamically stable.

As will be discussed in connection with FIGURE 7, other relative positions of the spring member 24 are dynamically unstable because the opposing forces of the inner spring arm 66 and the outer spring arms 62 and 64 are, in such instances, offset from each other so that the spring 24 then exerts a net torque on the operating lever 22 to urge a return of the arrangement to the stable relation noticed in connection with FIGURE 6. Of course, withdrawal of the spring 24 from the lever 22 is precluded by the latching engagement of the spring arm notches 68 with the lever notches 76.

Clockwise pivotal movement of the operating lever 22 from its limiting counterclockwise position forces the spring member 24 to pivot along with the lever 22. Thus, the force which impels the pivotal movement of the spring 24 is sufficient to overcome any resiliently responsive outward forces of the push button 14 so that the button 14 is depressed with pivotal movement of the lever 22. However, when the button 14 is fully depressed, further pivotal movement of the lever 22 can be obtained without corresponding pivotal movement of the spring 24 and without a malfunctioning of the actuating means 12. Thus, during the interval of movement of the lever 22 when the spring 24 forces the button 14 to be depressed, response forces from the button 14 are not sufficient to cause the spring 24 to advert from its dynamically stable relation with the lever 22. However, when the button 14 is fully depressed, the button forces in response to further movement or rotation of the spring 24 are rapidly increased to provide a net torque operating on the spring 24 in a counterclockwise direction relative to the lever 22. The magnitude of the latter torque is sufficient, with continued pivotal movement of the lever 22, to restrain downward movement of an end section 25 of the spring 24, resulting in a movement of the lever 22 and spring 24 into their dynamically unstable relation depicted in FIGURES 5 and 7.

When the operating lever 22 is pivoted to its limiting clockwise position, as indicated by the reference character 40 (FIG. 2), the spring member 24 is positioned relative to the lever 22, as shown in FIGURES 5 and 7 to urge the lever 22, upon a release of operating forces, to the normal or dynamically stable relation relative to the spring 24, as shown in FIGURES 3 and 6. The latter relation is occasioned because the inner spring leg 66 is deformed to an upward position and the outer spring legs 62 and 64 are deformed to lower positions, as shown in FIGURE 5, so that increased resilient forces are imposed upon the lever 22 by the spring 24, and because, as illustrated in FIGURE 7, the lever 22 is pivoted to be related angularly and not perpendicularly to the spring 24. With the angular relation between the lever 22 and the spring 24, the resilient forces of the inner spring arm 66 are directed toward an adjoining lever portion 84 and the resilient forces of the outer spring arms 62 and 64 are directed toward an adjoining lever portion 86. As readily observable, the lever portions 84 and 86 are located in offset vertical planes so that the resilient forces of the spring arm 66 and the resilient forces of the spring arms 62 and 64 are directed against the lever 22 in offset planes, and in opposite directions, to impose a net torque upon the lever 22 in a counterclockwise direction. The latter torque is a stabilizing torque which urges the lever 22 into its normal position with respect to the spring 24.

Thus, upon release of operating forces on the lever 22, the latter torque causes counterclockwise pivotal movement of the lever 22 relative to the spring 24 until the stable relation between the lever 22 and the spring 24 is achieved, as illustrated in FIGURES 2 and 6. During or after the stabilization of the lever 22 and the spring 24, the resiliently responsive forces of the switch button 14, as ordinarily provided in devices such as the switch 11, are employed to return, as a unit, the lever 22 and the spring 24 to their limiting counterclockwise position shown in FIGURE 2.

By suitably prestressing the spring member 24, the resilient forces of the spring arms 62, 64 and 66 can be made great enough to maintain the lever 22 and the spring 24 in their normal relation, by offsetting, as already noted, the destabilizing effects of the responsive forces of the switch button 14, until a full depression of the button 14 is achieved, at which time pivotal movement of the lever 22 can be continued to its limiting clockwise station, as already described, without correspondnig movement of the spring end section 25. Of course, as noted previously, the spring 24 becomes angularly related to the lever 22 during the continued and independent rotation of the lever 22. Thus, only an interval of the total span of pivotal movement of the lever 22 occasions an operation of the switch button 14 and the remaining piovtal motion of the lever 22 is accomplished without occasioning any movement of the button 14.

As noted previously, the spacer 46, having an arm portion 53 projected through the lever slot 54, precludes separation of the lever 22 from the switch 11. By previous implication, the spacer portion 53 does not restrict pivotal movement of the lever 22 toward its limiting clockwise position.

As an example of the various applications that can be made of the illustrative embodiment of the invention, the plate 20 of the wiring device 10 can be mounted on a door frame with the use of fasteners (not shown), which can be passed through plate openings 88 to secure the entire arrangement in the frame so that a sliding door, of contemporary popularity, can be mounted for movement along the lintel of the frame to provide the necessary forces for operating the lever 22. In this example, a full closing of the door will cause the lever 22 to be pivoted to its limiting clockwise position effecting a depression of the switch button 14 to control, as an example, an electrically associated lighting device which can be mounted in a cubicle enclosed by the sliding door. If the sliding door, upon being closed, were to bounce back to a slightly open position, the lever 22 would not be sufficiently pivoted in a counterclockwise direction to reach the critical position which occasions a release of the depressed button 14. If the sliding door were opened a further amount, the switch button 14 would be released, but the amount that the door would be opened would be sufficient to reveal that the interior lighting device had not been switched from one circuit condition to another. In other terms, a prescribed amount of overtravel of the sliding door can be enabled with the use of the present invention without any effect upon the circuit control provided by the wiring device 10.

Also of noteworthy import is the fact that the invention can be embodied to required the application of only relatively small operating forces so that, in the cited example, even the most freely rolling sliding doors would not be reopened by responsive forces from the wiring device lever 22 upon a closing of the door over the lever 22.

In the foregoing description, the mode of operation of an arrangement of specified elements has been related to point out the principles of the invention. The description, therefore, has only been illustrative of the invention, and, accordingly, it is desired that the invention be not limited by the arrangement or embodiment described here, but, rather, that it be accorded an interpretation consistent with the scope and spirit of its broad principles.

What is claimed is:

1. The combination comprising an elongated wiring device having actuating means on a front side thereof for making and breaking an electrical circuit, means including an elongated lever pivotally positioned relative to said wiring device front side for operating said actuating means, an elongated generally planar mounting plate having a transverse portion at one end thereof engaging an adjacent end of said wiring device to secure said mounting plate against separation from said wiring device along a direction substantially normal to the plane of said mounting plate and to space said one end of said mounting plate outwardly of said wiring device front side, a bracket for spacing the other end of said mounting plate outwardly from the other end of said wiring device, said lever generally extending along and projecting outwardly through an opening in said mounting plate, said bracket having a portion thereof engaging one end portion of said lever to support the latter in its pivotal position for movement to and outwardly of the front plane of said mounting plate, and means for securing together said other ends of said mounting plate and said wiring device with said bracket positioned therebetween.

2. The combination comprising an elongated wiring device having actuating means on a front side thereof for making and breaking an electrical circuit, an elongated generally planar mounting plate, means for securing said mounting plate in outwardly spaced relation to said front side of said wiring device, an elongated lever member pivotally supported relative to said wiring device front side for operating said actuating means and having a first portion extending outwardly through a first opening in said mounting plate from said front side of said wiring device and a second portion continuous with said first portion extending inwardly through a second mounting plate opening longitudinally spaced from said first opening, a projecting portion of said lever second portion engageable with the side of said mounting plate that faces said wiring device to provide one limit of pivotal movement for said lever member, the region of said mounting plate between said first and second openings recessed inwardly to form a second limit of pivotal movement for said lever member in which said lever member first portion and the front side of said mounting plate are substantially flush relative to each other, and said second opening disposed longitudinally outward of the associated end of said wiring device so that said lever second portion is free to move in a lateral plane outwardly of said associated wiring device end.

3. The combination comprising an elongated wiring device having actuating means on a front side thereof for making and breaking an electrical circuit, an elongated generally planar mounting plate, means for securing said mounting plate in outwardly spaced relation to said front side of said wiring device, an elongated lever member pivotally supported relative to said wiring device front side for operating said actuating means and having a first portion extending outwardly through a first opening in said mounting plate from said front side of said wiring device and a second portion continuous with said first portion extending inwardly through a second mounting plate opening longitudinally spaced from said first opening, a projecting portion of said lever second portion engageable with the side of said mounting plate that faces said wiring device to provide one limit of pivotal movement for said lever member, and the region of said mounting plate between said first and second openings recessed inwardly to form a second limit of pivotal movement for said lever member in which said lever member first portion and the front side of said mounting plate are substantially flush relative to each other.

4. The combination comprising an elongated wiring device having actuating means on a front side thereof for making and breaking an electrical circuit, means for securing an elongated generally planar mounting plate in outwardly spaced relation to said wiring device front side, operating means including an elongated lever member and a spring member, said securing means having a portion thereof engaging an inner end portion of said lever member to support said operating means in assembled and operative relation to said actuating means, said lever member having a first portion extending outwardly through a first opening in said mounting plate from said lever end portion and from said front side of said wiring device, said lever member having a second portion continuous with said first portion extending inwardly through a second mounting plate opening longitudinally spaced from said first opening, a projecting portion of said lever second portion engageable with the side of said mounting plate that faces said wiring device to provide one limit of pivotal movement for said lever member, the region of said mounting plate between said first and second openings recessed inwardly to form a second limit of pivotal movement for said lever member in which said lever member first portion and the front side of said mounting plate are substantially flush relative to each other, means including said inner end portion of said lever member and said spring member for providing full following motion of said spring member with said lever member relative to said actuating means only over one portion of the lever path of movement, said lever member moving relative to said spring member and said spring member being stationary relative to said actuating means of said wiring device during motion of said lever member through portions of said path other than said one path portion, and said mounting plate limiting the movement of said lever member in both the clockwise and counterclockwise direction.

5. An arrangement for operating switching means and the like, said arrangement comprising an elongated generally planar plate member, means for pivotally assembling an elongated lever switch actuating member inwardly of an inner side of said plate so that a first portion of said lever projects outwardly through a first opening in said plate and so that a second portion of said lever continuous with said first lever portion extends inwardly through a second plate opening longitudinally spaced from said first opening, the region of said plate between said first and said second openings recessed inwardly to provide a limit for the pivotal movement of said lever in one direction and to allow said lever first portion to be flush with said plate in this one limited position, and said lever having a portion adjacent one of the first and second plate openings to engage said plate and thereby form a limit for the pivotal movement of said lever in the direction opposite said one direction.

6. A wiring device combination comprising a switch device having actuating means projecting through one elongated side thereof for making and breaking an electrical circuit, means for mounting said wiring device combination, means for operating said actuating means including a first elongated lever member pivotally supported on said switch device so as to be movable pivotally over a path from a position outwardly of to a position aligned with a reference plane parallel with a front side of said wiring device combination in response to operating forces provided by an object movable along a reference plane parallel with said front wiring device side, said operating means also including a spring member having one portion engaging said actuating means and another portion having each of opposite sides abutting said lever member, said abutting sides of said other portion imposing respective and equal but opposite resilient forces upon said lever member to urge said spring and said lever members into abutting relation, said abutting relation maintained during motion of said lever member through one segment of said path to enable said actuating means to be operated by said spring member, said abutting relation removed and relative movement between said spring and lever members occurring so that said spring other portion sides merely adjoin said lever member in respective and offset planes in the longitudinal direction of said lever member when said actuating means impose reactionary forces of sufficient amplitude on said spring one portion to overcome the urging effect of said abutting relation by said spring member other portion.

7. An arrangement for controlling the continuity of an electrical circuit, said arrangement comprising actuating means for making and breaking said circuit, a lever member positioned to respond to operating forces, means for securing said lever member in assembled and operative relation with said actuating means, a spring member responsive to said lever member and positioned to operate said actuating means, said lever member being movable through a defined path in response to operating forces, said spring member having one portion engaging said actuating means and another portion having each of opposite sides abutting said lever member, said abutting sides of said other portion imposing respective and equal but opposite resilient forces upon said lever member to urge said spring and said lever members into abutting relation, said abutting relation maintained during motion of said lever member through one segment of said path to enable said actuating means to be operated by said spring member, said abutting relation removed and relative movement between said spring and lever members occurring so that said spring other portion sides merely adjoin said lever member in respective and offset planes in the longitudinal direction of said lever member when said actuating means impose reactionary forces of sufficient amplitude on said spring one portion to overcome the urging effect of said abutting relation by said spring member other portion.

8. The combination comprising a wiring device having actuating means for making and breaking an electrical circuit, a lever member positioned to respond to operating forces, means for securing said lever member in assembled and operative relation with said wiring device, a spring member responsive to said lever member and positioned to operate said actuating means, said lever member being movable through a defined path in response to operating forces, said spring member having one portion engaging said actuating means and second and third portions resiliently abutting said lever member, said second and third portions imposing equal but opposite resilient forces upon said lever member to urge said spring and said lever members into abutting relation, said abutting relation maintained during motion of said lever member through one segment of said path to enable said actuating means to be operated by said spring member, said abutting relation removed and relative movement between said spring and lever members occurring so that said spring second and third portions merely ajoin said lever member in respective and offset planes in the longitudinal direction of said lever member when said actuating means impose reactionary forces of sufficient amplitude on said spring one portion to overcome the urging effect of said abutting relation by said spring member second and third portions.

9. The combination comprising a wiring device having actuating means for making and breaking an electrical circuit, a lever member positioned to respond to operating forces, means for securing said lever member in assembled and operative relation with said wiring device, a spring member responsive to said lever member and positioned to operate said actuating means, said lever member being movable through a defined path in response to operating forces, said spring member having one portion engaging said actuating means and second and third portions resiliently abutting said lever member, said second and third portions imposing equal but opposite resilient forces upon said lever member to urge said spring and said lever members into abutting relation, said abutting relation maintained during motion of said lever member through one segment of said path to enable said actuating means to be operated by said spring member, said abutting relation removed and relative movement between said spring and lever members occurring so that said srping second and third portions merely adjoin said lever member in respective and offset planes in the longitudinal direction of said lever member when said actuating means impose reactionary forces of sufficient amplitude on said spring one portion to overcome the effect of the urging of said abutting relation by said spring member second and third portions, and one of said second and said third portions having means for preventing motion of said spring member relative to said lever member between said offset planes.

10. An arrangment for controlling the continuity of an electrical circuit, said arrangement comprising actuating means for making and breaking said circuit, a lever member positioned to respond to operating forces, means for securing said lever member in assembled and operative relation with said actuating means, a spring member responsive to said lever member and positioned to operate said actuating means, said lever member being movable through a defined path in response to operating forces, said spring member having one portion engaging said actuating means and another portion having each of opposite sides abutting said lever member, said abutting sides of said other portion imposing respective and equal but opposite resilient forces upon said lever member to urge said spring and said lever members into abutting relation, said abutting relation maintained during motion of said lever member through one segment of said path to enable said actuating means to be operated by said spring member, said abutting relation removed and relative movement between said spring and lever members occurring so that said spring other portion sides merely adjoin said lever member in respective and offset planes in the longitudinal direction of said lever member when said actuating mean imposes reactionary forces of sufficient amplitude on said spring one portion to overcome the effect of the urging of said abutting relation by said spring member other portion, and means forming a part of said other portion for preventing motion of said spring member relative to said lever member between said offset planes.

References Cited in the file of this patent

UNITED STATES PATENTS

| | | |
|---|---|---|
| 2,701,287 | Winter | Feb. 1, 1955 |
| 2,808,490 | Case et al. | Oct. 1, 1957 |
| 2,824,197 | Bolek | Feb. 18, 1958 |
| 2,898,428 | Holden | Aug. 4, 1959 |
| 2,911,509 | Millerwise | Nov. 3, 1959 |
| 2,939,337 | Sweger | June 7, 1960 |

FOREIGN PATENTS

| | | |
|---|---|---|
| 846,034 | Great Britain | Oct. 14, 1958 |